United States Patent
Vaidya et al.

(10) Patent No.: US 11,696,322 B2
(45) Date of Patent: Jul. 4, 2023

(54) ACCOMMODATING PRIORITY SERVICE USERS IN IEEE 802.11BE BSS

(71) Applicant: CHARTER COMMUNICATIONS OPERATING, LLC, St. Louis, MO (US)

(72) Inventors: Maulik Vaidya, Palmdale, CA (US); Ahmad Reza Hedayat, Aliso Viejo, CA (US); Manish Jindal, Lone Tree, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 98 days.

(21) Appl. No.: 17/025,599

(22) Filed: Sep. 18, 2020

(65) Prior Publication Data
US 2022/0095315 A1    Mar. 24, 2022

(51) Int. Cl.
| | |
|---|---|
| *H04W 72/56* | (2023.01) |
| *H04W 74/08* | (2009.01) |
| *H04W 72/1268* | (2023.01) |
| *H04W 76/27* | (2018.01) |
| *H04W 52/02* | (2009.01) |

(52) U.S. Cl.
CPC ....... *H04W 72/56* (2023.01); *H04W 52/0216* (2013.01); *H04W 72/1268* (2013.01); *H04W 74/085* (2013.01); *H04W 76/27* (2018.02)

(58) Field of Classification Search
CPC ............. H04W 72/10; H04W 52/0216; H04W 72/1268; H04W 74/085; H04W 76/27
See application file for complete search history.

(56) References Cited

U.S. PATENT DOCUMENTS

| | | | | |
|---|---|---|---|---|
| 2014/0064257 A1* | 3/2014 | Fontaine | .............. | H04B 7/2656 370/336 |
| 2014/0148118 A1* | 5/2014 | Lorenz | .............. | H04W 52/0209 455/404.1 |
| 2014/0301260 A1* | 10/2014 | Park | ...................... | H04W 74/06 370/311 |
| 2016/0374017 A1* | 12/2016 | Stacey | .............. | H04W 52/0216 |
| 2018/0255563 A1* | 9/2018 | Chen | ................... | H04W 52/281 |
| 2021/0099951 A1* | 4/2021 | Kim | ................... | H04W 28/0268 |
| 2021/0144778 A1* | 5/2021 | Cherian | ................. | H04W 4/90 |

* cited by examiner

*Primary Examiner* — Dinh Nguyen
(74) *Attorney, Agent, or Firm* — Meagher Emanuel Laks Goldberg & Liao, LLP

(57) ABSTRACT

Various embodiments comprise systems, methods, architectures, mechanisms and apparatus providing improved National Security and Emergency Preparedness (NS/EP) Priority Services mechanisms within the context of IEEE 802.11-type networks.

23 Claims, 5 Drawing Sheets

ACCOMMODATING PRIORITY SERVICE USERS IN IEEE 802.11BE BSS

FIELD OF THE DISCLOSURE

The present disclosure generally relates to wireless communications systems and related networks, and more particularly to mechanisms supporting emergency telecommunications service in wireless communications systems such as those accessed via 802.11 access points.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Government regulations identify a special class of wireless network users which are to be provided with priority access to wireline and wireless networks, such as during times of network congestion and/or emergencies. US regulations contemplate a Government Emergency Telecommunications Service (GETS) for legacy/wireline networks, a Wireless Priority Service (WPS) for mobile networks, and a National Security and Emergency Preparedness (NS/EP) for Next Generation Network (NGN) use such as provided by 802.11 access points and the like.

Generally speaking, priority treatment in telecommunications/networking services consists of mechanisms applicable to various aspects (e.g., signaling, control, routing, and bearer/media traffic handling) that are essential for a greater probability of successful establishment and continuation of National Security and Emergency Preparedness (NS/EP) for Next Generation Network (NGN) Priority Services (PS). To increase the probability of successful invocation and establishment, it is desirable that the processing of a Service User's request with NS/EP NGN-PS invocation be provided some priority treatment immediately after its recognition as NS/EP NGN-PS-related, even if such priority treatment is given prior to the authorization as an NS/EP NGN-PS call/session or data request (with relevant security considerations). Such pre-authorization priority treatment allows the Service User's NS/EP NGN-PS invocation and service request to successfully reach, during congestion, the authorization processing functions that may reside in the originating network or another network. Without such priority treatment, a Service User's NS/EP NGN-PS invocation and service request may fail even before it can be authorized. For example, priority treatment should be provided to the routing of a Service User's NS/EP NGN-PS invocation and service request to the NS/EP NGN-PS authorization system, and priority treatment should be provided to the process of credentials collection required for the Service User/UE authorization.

The IEEE TGbe group of IEEE 802.11 agreed to support National Security and Emergency Preparedness (NS/EP) priority services for next-generation WiFi standards 802.11be (currently in early standardization phase). However, while an initial framework of NS/EP realization has been discussed, there is tremendous uncertainty as to an ultimate technical solution to the problem of delivering NS/EP NGN Priority Services.

For example, IEEE 802.11-20-0948/r0 contemplates the inclusion of information indicative of a NS/EP Priority Service capability in the "Extremely High Throughput (EHT) Medium Access Control (MAC) Capability Information" Element. Specifically, the modification of an EHT Capabilities inclusion of dot11PriorityService flag; when true, this flag indicates that priority channel access for NS/EP Priority Service shall be supported, and when false this flag indicates that such access is not supported. This allows an access point station (AP STA) to provide preferential/priority channel access to non-AP STAs supporting priority access over non-AP STAs not supporting priority access.

Unfortunately, among various deficiencies, this mechanism does not influence the behavior of non-AP STAs not supporting priority access with respect to Carrier-sense multiple access with collision detection (CSMA/CD), and only offer limited support for non-AP STAs supporting priority access executing real-world tasks (e.g. a Voice over IP, or Voice over WiFi call during times of declared emergencies such as wildfires).

SUMMARY

Various deficiencies in the prior art are addressed by systems, apparatus, and methods providing improved National Security and Emergency Preparedness (NS/EP) Priority Services mechanisms within the context of IEEE 802.11-type networks.

Multiple groups of embodiments are disclosed herein and may be implemented individually or in an combination to support differing and robust NGN priority services solutions for 802.11 Basic Service Set (BSS) components such as access point stations (AP STAs) and the like. For example, various embodiments contemplate operational modifications of AP STAs to provide preferential/priority channel access to non-AP STAs supporting priority access over non-AP STAs not supporting priority access, wherein the operational modifications further influence the behavior of the non-AP STAs not supporting priority access with respect to, illustratively, carrier-sense multiple access with collision detection (CSMA/CD).

A first group of embodiments supports priority service by using a priority access signaling mechanism to reduce channel activity of non-priority non-AP STAs. Generally speaking, the first group of embodiments embodiment contemplates that a novel information element denoted herein as "dot11priorityAccessAssertion" may be included in, but not limited to, the following messages: (1) Beacon Frame; (2) Traffic Indication Map (TIM) Broadcast request with Channel Switch Announcement (CSA) information element (IE); or (3) Extended CSA IE.

A second group of embodiments enforces priority service by extending a target wake time (TWT) of non-priority non-AP STAs to thereby reduce communications channel activity of non-priority non-AP STAs.

A third group of embodiments enhances service for low bandwidth priority communications by reserving solely for priority non-AP STAs some channel capacity normally reserved for low bandwidth upload communications by any non-AP STA.

A fourth group of embodiments enhances service for low bandwidth priority communications by using a Quiet Channel information element (IE), which defines a time interval during which no transmission occurs in the current channel, normally to enable functions such as making channel measurements without receiving interference from other nearby STAs.

A first method for supporting priority services at an 802.11 access point (AP) according to an embodiment comprises: receiving, at a non-priority non-AP station (STA) in communication with an AP STA via a communication channel, a message from the AP STA; in response to the received message including a dot11priorityAccessAssertion information element (IE) including a dot11priorityAccessEnforced field, causing the non-priority STA to refrain from accessing the communication channel for an amount of time indicated by a duration value in a durationOfdot11priorityAccessEnforced field of the dot11priorityAccessAssertion IE.

A second method for supporting priority services at an 802.11 access point (AP) may comprise, alone or in combination with the first method, at an AP STA, entering a priority service mode and determining an amount of service reduction to impose upon non-priority non-AP STAs in communication with the AP STA; transmitting, toward non-AP STAs in communication with the AP STA, one or more messages including a dot11priorityAccessAssertion information element (IE) including a dot11priorityAccessEnforced field and a durationOfdot11priorityAccessEnforced field, and configured to cause a receiving non-priority STA to refrain from accessing a respective communication channel for an amount of time indicated by a duration value in the durationOfdot11priorityAccessEnforced field.

A third method for supporting priority services at an 802.11 access point (AP) may comprise, alone or in combination with the first and/or second methods, transmitting, toward non-AP STAs in communication with the AP STA, a message announcing an availability of one or more resource units (RUs) within an UL-OFDMA frame, and including a predetermined value stored in an AID12 field and configured to cause non-priority non-AP STAs to refrain from reporting data within the advertised RUs.

A fourth method for supporting priority services at an 802.11 access point (AP) may comprise, alone or in combination with the first, second, and/or third methods, transmitting, toward non-AP STAs in communication with the AP STA, a quiet channel command having a priority service field configured to cause only non-priority non-AP STAs to enter a quiet mode of operation.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments provide multiple mechanisms by which Priority Service to non-AP STAs may be achieved or supported; namely, via (1) a priority access signaling mechanism; (2) a target wake time (TWT) mechanism; (3) a Priority Service UORA mechanism; and (4) an priority quiet channel mechanism according to an embodiment. It is noted that the multiple mechanisms may be used individually or in any combination.

Figure 1:
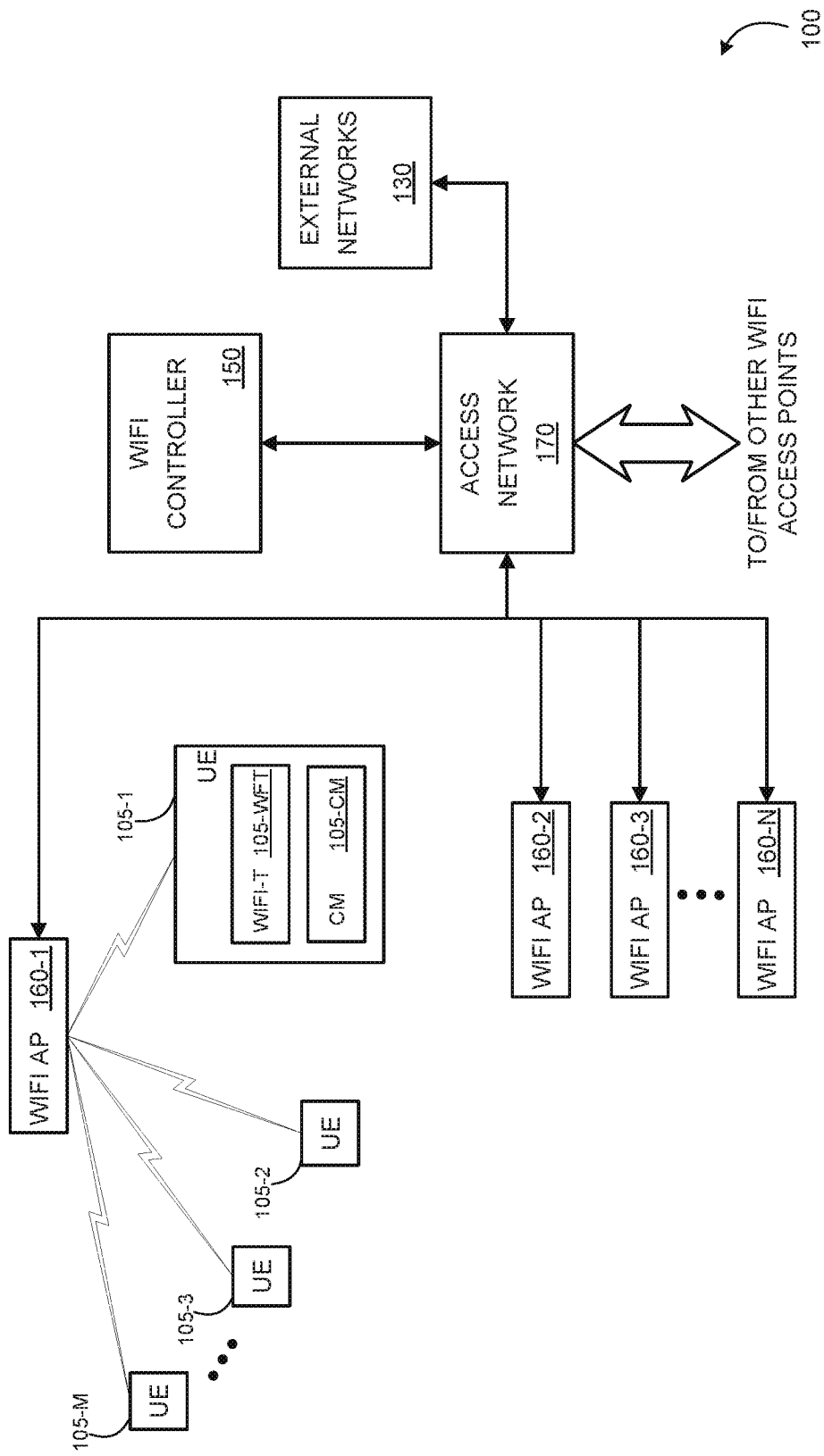
FIG. 1 depicts a block diagram of a simplified network services architecture suitable for use in various embodiments.

FIG. 1 depicts a block diagram of a simplified network services architecture suitable for use in various embodiments. Specifically, FIG. 1 depicts a network services architecture in which non-access point stations (non-AP STAs, also denoted herein as user equipment (UE)) 105 utilize network services (e.g., voice, streaming media, data upload/download etc.) delivered via access point stations (AP STAs, also denoted herein as WiFi access points (WAPs or APs)) 160 in accordance with various communications protocols, such as the IEEE 802.11 family of specifications developed by the Institute of Electrical and Electronics Engineers to support wireless local area networking (WLAN) functions.

Referring to FIG. 1, a plurality of access point stations (AP STAs) 160-1, 160-2, 160-3 and so on up to 160-N (collectively AP STAs 160) comprise, illustratively, 802.11 wireless access points such as deployed by a network services provider to subscribers at their homes, businesses or other locations, and configured to communicate with non-AP STAs 105 and with an access network 170. The access network comprises a back-haul network or other communications network suitable for supporting traffic between the AP STAs 160 and external networks 130, such as the internet or other core network. In various embodiments, the network services provider utilizes numerous AP STAs 160 distributed over a "coverage footprint" to provide network services to mobile and stationary devices connected thereto, such as discussed herein.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The various embodiments contemplate the UE are configured to communicate via at least one WiFi access point technology at least similar to that provided by the IEEE 802.11 family of specifications (e.g., the 802.11xx specifications such as 802.11b, 802.11a, 802.11g, 802.11n, 802.11ac, 802.11ax, 802.11be and so on).

As shown in FIG. 1, a group of non-AP STAs or user equipment (UE) 105-1 through 105-M (collectively non-AP STA or UE 105) are depicted as being configured for wirelessly communicating with a first WiFi Access Point (WAP or AP) 160-1, which is connected to a WiFi Controller 150 via, illustratively, an access network 170 such as provided by a telecommunications, cable television, and/or other network services provider.

Each non-AP STA 105 comprises a WiFi transceiver 105-WFT configured for communication with an AP STA160 in accordance with 802.11 protocols, and a connection manager 105-CM configured to manage communications with the APs 160, and to facilitate handoffs and UE migration between different AP STAs 160. The UE 105 also comprises various other components, modules, antennas, and the like (not shown). The connection manager 105-CM is configured to perform the various processing, storage, and input/output functions described herein with respect to non-AP STAs, such as described below with respect to FIGS. 2-5.

As depicted in FIG. 1, a WiFi controller 150 is depicted as communicating with a WiFi Access Point (WAP or AP) 160 via an access network 170. The WiFi controller 150, illustratively a general purpose computer server, network operations center (NOC) or other provider equipment, is configured to perform various WiFi control functions associated with a large number of APs 160, as well as an even larger number of UEs 105 configured to communicate with the APs 160. For simplification of the discussion, only one WAP 160 is shown in FIG. 1 as communicating with WiFi controller 150, and only one UE 105 (i.e., UE 105-1), is shown in FIG. 1 as communicating with that WAP 160.

Various elements or portions thereof depicted in FIG. 1 and having functions described herein are implemented at least in part as computing devices having communications capabilities, processing capabilities and the like, including for example the non-AP STAs 105, AP STAs 160, and WC 150. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Supporting Priority Service Via a Priority Access Signaling Mechanism

Various embodiments contemplate operational modifications of access point stations (AP STAs) to provide preferential/priority channel access to non-AP STAs supporting priority access over non-AP STAs not supporting priority access, wherein the operational modifications further influence the behavior of the non-AP STAs not supporting priority access with respect to, illustratively, carrier-sense multiple access with collision detection (CSMA/CD).

A first group of embodiments supports priority service by using a priority access signaling mechanism to reduce channel activity of non-priority non-AP STAs. Generally speaking, the first group of embodiments embodiment contemplates that a novel information element denoted herein as "dot11priorityAccessAssertion" may be included in, but not limited to, the following messages: (1) Beacon Frame; (2) Traffic Indication Map (TIM) Broadcast request with Channel Switch Announcement (CSA) information element (IE); or (3) Extended CSA IE.

An exemplary dot11priorityAccessAssertion IE may be formed in accordance with the following fields to provide a mechanism according to an embodiment.

Field 1: dot11priorityAccessEnforced: An optional field used to indicate by its presence that all non-AP STAs currently not utilizing or not supporting the dot11priorityAccess NS/EP NGN Priority Services mechanisms must modify channel access procedures per (illustratively) the two additional parameters/fields included within the dot11priorityAccessAssertion information element, as follows.

Field 2: durationOfdot11priorityAccessEnforced: An optional field used to provide a parameter indicative of a duration of time enforcement of NS/EP priority access in the current basic service set identifiers (BSSID) by the AP STAs. The duration may be indicated in units of time (e.g., microseconds (uS) milliseconds (mS), second (S) and the like), a number of subsequent channel occupancy times (COTs), such as 5 or 10 or some other number of COTS starting from receipt of this field, or some other indication of duration.

Field 3: allowedCAPCduringpriorityAccess: An optional field used to provide a parameter for indicating that the only non-AP STAs allowed to attempt channel access procedures on a particular channel in this BSS are those whose target wake time (TWT) has expired or is about to expire during the current COT.

In operation, AP STA and non-AP STA implementing the priority service mechanism of the first embodiment performs various functions in accordance with the logic flow laid out in the relevant IEEE 802.11 specifications. The priority service mechanisms may be invoked by the AP STA using the above-described fields such that the non-AP STA responds in an appropriate manner.

Figure 2:
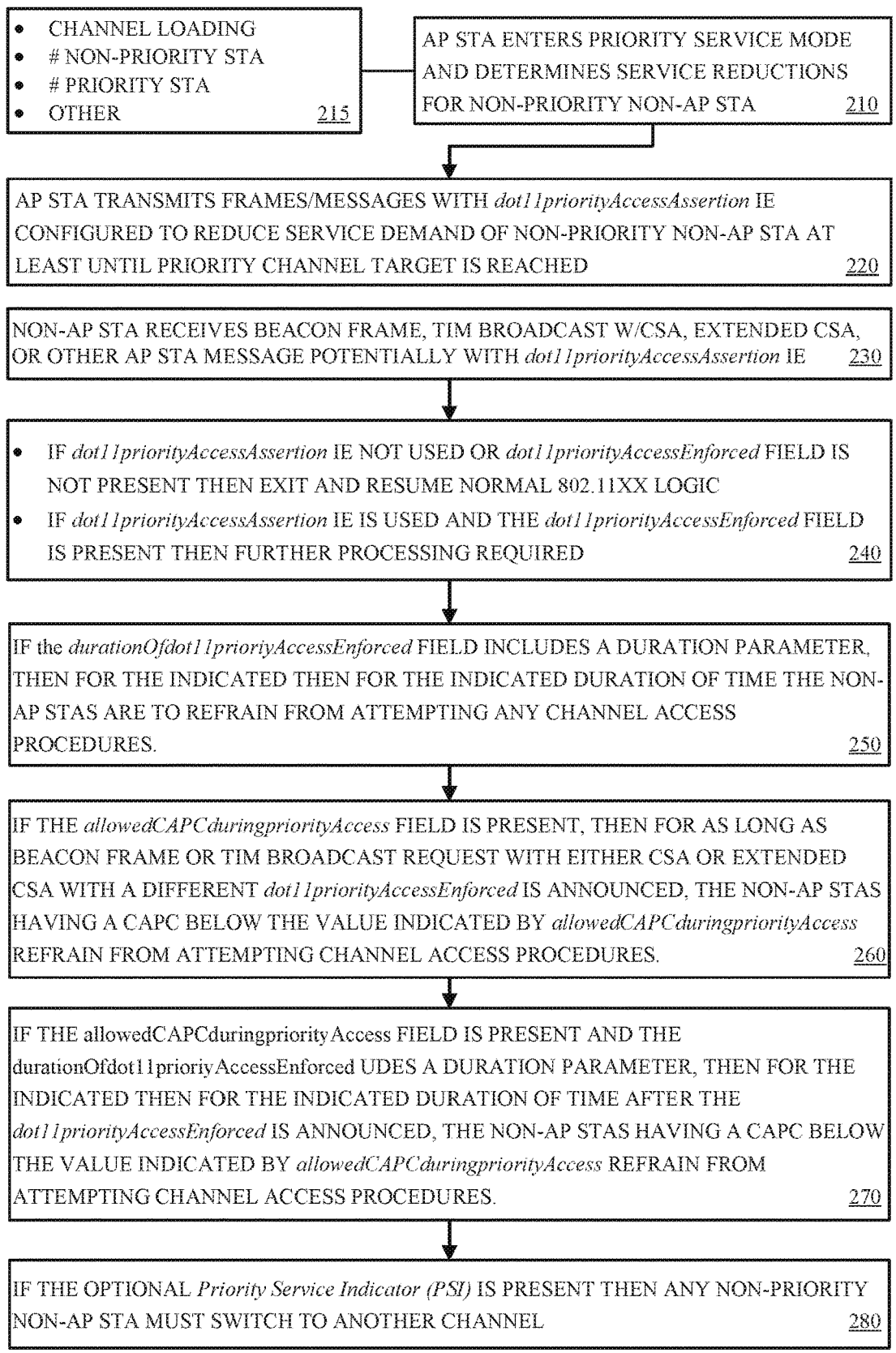
FIG. 2 depicts a flow diagram of a method of supporting priority services using a priority access signaling mechanism according to an embodiment.

FIG. 2 depicts a flow diagram of a method of supporting priority services using a priority access signaling according to an embodiment. Specifically, FIG. 2 depicts a flow diagram of a method 200 for an AP STA to determine and implement command-based service reductions via priority service communications to the non-AP STAs (steps 210-220) and for non-AP STA processing of priority service communications received the an AP STA (steps 230-280).

At step 210, an AP STA enters a priority service mode and determines a number of service reductions to be enacted with respect to non-priority non-AP STAs. Referring to box 215, these service reductions may be determined with respect to factors including, but not limited to, current channel loading in this BSS (or an extended service set (ESS) including this BSS), a number of non-AP STAs invoking priority access in this BSS/ESS, a number of connected non-priority non-AP STA in this BSS/ESS, and/or other factors.

Specifically, various embodiments operate to prioritize services delivery to priority non-AP STAs by implementing service reductions or controlled throttling of the network services provided to non-priority non-AP STAs in accordance with one or more mechanisms as discussed below. Determinations about an amount of non-priority non-AP STA service reduction may be made by an AP STA 160 and/or WC 150. The determination may be a simple determination that any non-priority non-AP STA must wait for all priority non-AP STAs to receive whatever services they require. More fine grained determinations may be made with respect to network conditions, a ratio and/or number of priority and or non-priority STAs using network services, an actual/expected changes in the ratio and/or numbers, and other criteria.

A determined amount of service reduction may be total (e.g., only priority non-AP STAs are allowed to receive network services), on an "as available" basis (e.g., non-priority non-AP STAs may receive network services only if there are no priority non-AP STAs requesting such services and some service availability remains), selective based on a ranking or subscription tier hierarchy (e.g., some non-priority non-AP STAs are selected for service reduction/throttling first), selective based on application (e.g., only high bandwidth services such as video streaming are reduced or stopped entirely for non-priority non-AP STAs, while voice or messaging services are allowed), and so on. A useful application-level throttling is preventing non-priority non-AP STAs from streaming video of an emergency situation (e.g., a wildfire) while still allowing these STAs to communicate via voice or messaging services.

At step 220, the AP STA implements command-based service reductions for the non-priority non-AP STAs that have been determined to receive service reductions. That is, frames and/or messages including the dot11priorityAccessAssertion IE and related IEs/fields are used by the AP STA to cause non-priority non-AP STAs to reduce channel activity and provide thereby priority service to the priority non-AP STAs.

At step 230, non-AP STA receives messages from AP STA potentially including priority service information. Referring to box 215, the priority service information may be included in a beacon frame, a TIM broadcast request with CSA, an extended CSA or other message/IE as described herein.

At step 240, for an AP STA that is NOT implementing the priority service mechanism of the first embodiment as indicated by the exemplary dot11priorityAccessAssertion IE not being used or, if used, the dot11priorityAccessEnforced field not being present, any non-AP STA communicating with this AP STA exists the method 200 and continues functioning in accordance with the normal 802.11be logic flow.

If at step 240, for AP STAs is implementing the priority service mechanism of the first embodiment, the exemplary dot11priorityAccessAssertion IE is used and the dot11priorityAccessEnforced field is present to indicate such implementation. The presence of dot11priorityAccessAssertion is to indicate to non-AP STAs not currently utilizing or not supporting dot11priorityAccess that further processing of the relevant fields broadcast by the AP STA are necessary, as follows.

At step 250, if the non-AP STAs determines that the dot11priorityAccessEnforced is present and the durationOfdot11priorityAccessEnforced field include a duration parameter, then for the indicated duration of time the non-AP STAs are to refrain from attempting any channel access procedures for the channel in question. The affected non-AP STAs may select other available channels for channel access procedures.

The indicated duration may be selected to controllably reduce an amount of service to non-priority non-AP STA. A very long duration will effectively deny services entirely to non-priority non-AP STA. The shorter the duration, the shorter the amount of time during which the non-priority non-AP STA will be denied services. In various embodiments, the amount of time for denying service may be reduced such that one or more service reductions imposed by the other mechanisms discussed herein (e.g., with respect to FIGS. 3-5) may be used alone or in combination to "tune" service reductions or throttling imparted to individual or groups of non-priority non-AP STA.

At step 260, if the non-AP STAs determines that the both the dot11priorityAccessEnforced and allowedCAPCduringpriorityAccess fields are present, then for as long as Beacon Frame or TIM Broadcast request with either CSA or Extended CSA with a different dot11priorityAccessEnforced is announced, the non-AP STAs having a Channel Access Priority Class (CAPC) below the value indicated by allowedCAPCduringpriorityAccess are to refrain from attempting channel access procedures. It is noted that the CAPC concept/mechanism as used and described herein is similar to concepts/mechanism described in various other standards documents and that these other concepts/mechanisms are also contemplated for use by the various embodiments described herein. For example, ETSI EN 301 893 refers to this concept/mechanism as a Priority Class (c.f. clause 4.2.7.3.2.4), and the 3GPP specifications (e.g. 37.213) which refer to this concept/mechanism as Channel Access Priority Class.

At step 270, if the non-AP STAs determines that the dot11priorityAccessEnforced and allowedCAPCduringpriorityAccess and durationOfdot11priorityAccessEnforced fields are present, then for the indicated duration of time after dot11priorityAccessEnforced is announced, then the non-AP STAs having a CAPC below the value indicated by allowedCAPCduringpriorityAccess are to refrain from attempting channel access procedures for the channel in question.

At step 280, the above embodiment is optionally modified by including an additional field within the CSA IE; namely a field denoted as Priority Service Indicator (PSI) that is operative to exempt STAs with priority service from switching, thereby forcing the remaining STAs (i.e., those STAs without priority service) to leave the channel. The Priority Service Indicator (PSI) may be expressed by associating priority service STAs with a traffic identifier (TID) indicative of those STAs exempted from this channel switching requirement.

Thus, in various embodiments, the method 200 of FIG. 2 provides that an AP STA operating in a non-priority mode of operation may provide network services to priority and non-priority non-AP STAs in a relatively standard manner. When entering a priority mode of operation, the AP STA is configured to include the use the dot11priorityAccessAssertion IE and related fields as described above and with respect to FIG. 2. In this manner, non-AP STAs operating as described herein are granted priority service status as appropriate.

Supporting Priority Service Via TWT Extension

A second group of embodiments enforces priority service by extending a target wake time (TWT) of non-priority non-AP STAs to thereby reduce communications channel activity of non-priority non-AP STAs.

The TWT mechanism of IEEE 802.11ax offers benefits such power saving for STAs and minimizing contention between STAs. The TWT mechanism allows a STA to negotiate with its associated AP to schedule for periodic wake times, when the STA wakes up for an interval (e.g., a TWT Service Period (SP)) and exchanges frames with the AP. Other than the TWT SP, the TWT requesting STA can go to a sleep mode, and even skipping Beacon frames, helping to reduce energy consumption. It is noted that during TWT SPs, other STAs may access the channel, hence TWT does not provide contention-free channel access. TWT SPs may be trigger-enabled, where the AP sends at least one trigger frame allocating resources for the TWT requesting STA, ensuring the STA is provided UL resource units (RU) during the SP. Also, a STA may not be allowed to immediately start a transmission without waiting for a frame from the AP, unless after a timeout. An individual TWT may be negotiated/agreed between a pair of STAs, after a negotiation exchange that includes request, alternation, accept or rejection. A TWT Teardown frame, sent by the AP or the STA, tears down the TWT. Broadcast TWT SPs, which are not negotiated, may also be used. Broadcast TWT SPs are scheduled by the AP which distributes information about them in Beacon frames. Non-AP STAs receiving the broadcast TWT should transmit information only within the announced broadcast TWT SPs and for reception of a subset of Beacon frames, and may go to sleep during other times. Various embodiments are configured to utilize TWT mechanisms similar to that described in the IEEE 802.11ax, which may be adopted in whole or in part for use within the context the IEEE 802.11be specifications.

Generally speaking, the second group of embodiments contemplates that a novel information element denoted herein as "extendTWTduetodot11priorityservice" may be included in target wake time (TWT) messages such as Demand TWT, Suggest TWT, and/or other TWT related messages used where an individual TWT agreement exists, and the TWT message uses the TWT parameters identified in the response frame. The value of the information element "extendTWTduetodot11priornyservice" may be indicated in units of time (e.g., microseconds (uS), milliseconds (mS), second (S).

The presence of the extendTWTduetodot11priorityservice is operative to force non-AP STAs to continue operating in a power-saving mode such that the corresponding channel avoids the burden of having the non-AP STAs perform channel access procedures and the like. Thus, for non-AP STA supporting dot11priorityAccess in a given BSS arriving or connecting to an AP STA, the AP STA may (i.e., optionally) choose to extend the TWT of the non-AP STA where the TWT is expiring in the current COT/TXOP.

Figure 3:
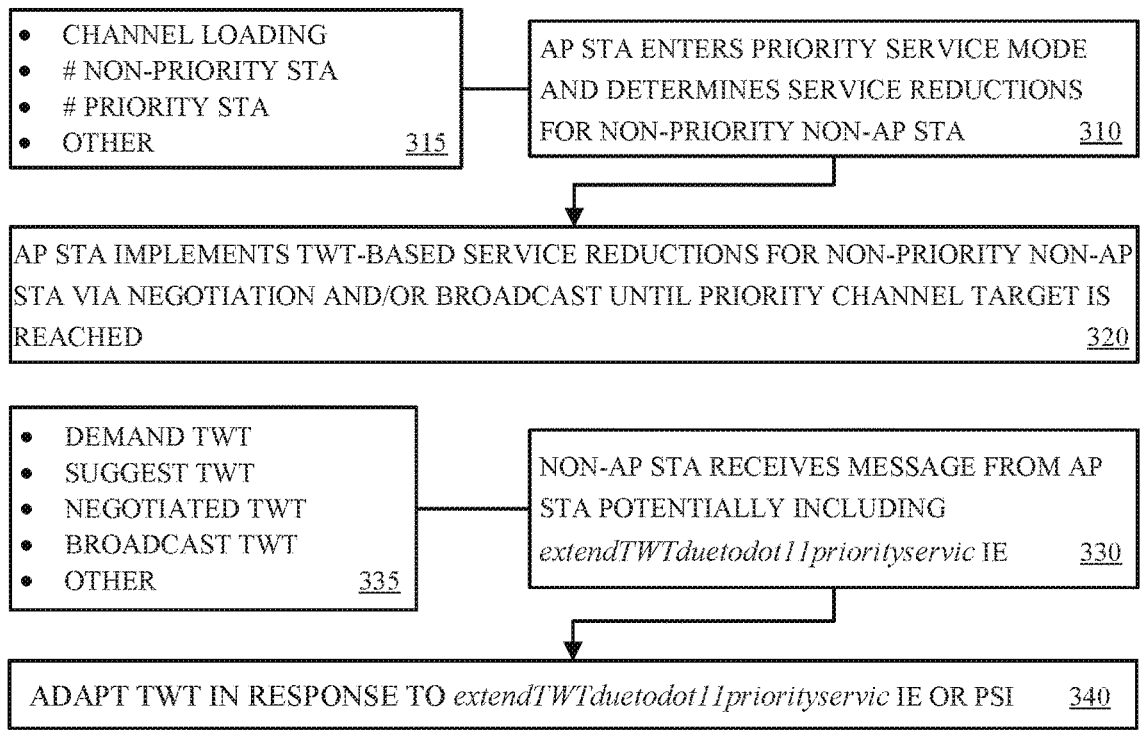
FIG. 3 depicts a flow diagram of a method of supporting priority services using a target wake time (TWT) mechanism according to an embodiment.

FIG. 3 depicts a flow diagram of a method of supporting priority services using a target wake time (TWT) mechanism according to an embodiment. Specifically, FIG. 3 depicts a flow diagram of a method for an AP STA to determine and implement a TWT-based service reduction via priority service communications to the non-AP STAs (steps 310-320) and for non-AP STA processing of priority service communications received the an AP STA (steps 330-340).

At step 310, an AP STA enters a priority service mode and determines a number of service reductions to be enacted with respect to non-priority non-AP STAs. Referring to box 315, these service reductions may be determined with respect to factors including, but not limited to, current channel loading in this BSS (or an ESS including this BSS), a number of non-AP STAs invoking priority access in this BSS/ESS, a number of connected non-priority non-AP STA in this BSS/ESS, and/or other factors such as described above with respect to step 210 and box 215 of the method 200 of FIG. 2.

At step 320, the AP STA implements TWT-based service reductions for the non-priority non-AP STAs that have been determined to receive service reductions. That is, the extendTWTduetodot11priorityservice is used by the AP STA to cause TWT-based service reductions using negotiated TWT mechanisms for individual non-AP STAs, broadcast TWT mechanisms for multiple non-AP STAs, or some combination thereof.

At step 320, if there are no STAs with individual TWT during the time that an AP wants to provide Priority Service to one or more PS/NE STAs, the AP may use flax broadcast TWT. Each 802.11ax Broadcast TWT is uniquely identified by the <broadcast TWT ID, AP MAC address>tuple. In various embodiments, 802.11be Broadcast TWT includes a Priority Service Indicator (PSI) (e.g. added to above tuple). Once Priority Service Indicator (PSI) in Broadcast TWT is announced all STAs, except non-AP STAs invoking dot11PriorityService are required to only transmit during the announced TWT SP. Outside of the identified TWT SP, only those non-AP STAs invoking dot11PriorityService are allowed to transmit.

Thus, by using the broadcast TWT, an AP STA may choose the duration of the broadcast TWT SP appropriately such that it can serve the intended non-AP STAs invoking dot11PriorityService STAs with the desired QoS.

At step 330, non-priority non-AP STA receives one or more messages from the AP STA potentially including the extendTWTduetodot11priorityservic IE. Referring to box 335, the message may comprise negotiated or broadcast messages indicative of a TWT-based service reduction, such as in a demand TWT, suggest TWT or other negotiated TWT message, a broadcast TWT message and/or some other message.

At step 340, the non-priority non-AP STA adapts TWT timing in response to the extendTWTduetodot11priorityservic IE.

Supporting Priority Service Via a Priority Service UORA Mechanism

A third group of embodiments enhances service for low bandwidth priority communications by reserving solely for priority non-AP STAs some channel capacity normally reserved for low bandwidth upload communications by any non-AP STA.

In 802.11ax, multi-user upload (UL) transmission to an AP STA is enabled by the AP STA exchanging a Trigger frame with one or more non-AP STAs identified/responding non-AP STAs. Various trigger frames are contemplated for differing purposes, with various fields included therein. Within the trigger frame format, a "Common info field" is used to define "trigger dependent common information" applicable to the entirety of an upcoming trigger-based (TB) frame, and a "User info field" for defining various fields including an initial 12-bit field denoted as "AID12." In addition to scheduled UL multi-user access, 802.11ax provides a UL OFDMA-based random access (UORA) mode wherein portions of an UL-OFDMA frame are assigned to no specific STA, but any STA may access those resource units. This mode of operation is useful for short upload transmission, data or control info such as buffer status reports, and the like, whether from an associated STA or unassociated STA. Various embodiments are configured to utilize UORA mode mechanisms similar to that of the IEEE 802.11ax's UORA mode, which may be adopted in whole or in part for use within the context of the IEEE 802.11be specifications.

The third group of embodiments extend the UORA mode by providing a Priority Service UORA wherein an AP may announce one or more resource units (RUs) within an UL-OFDMA frame and assigned for use by priority-service non-AP STAs. Priority non-AP STAs invoking dot11PriorityService may use a Priority Service UORA RUs to send any information element or frame such as to report any pending buffer status reports, grant requests and the like to the AP STA. Generally speaking, as long as a priority STA sends an information element or frame in the priority service UORA, the AP STA will process it. Optionally, unassociated non-AP STAs invoking dot11PriorityService and discovering an AP STA supporting dot11PriorityService may send a Probe Request or Association Request in the dedicated resource units for Priority Service UORA to the discovered AP STA.

One embodiment implements a Priority Service UORA for use with dot11PriorityService in which an AP STA assigns an individual resource allocation to a non-AP STA via the AID12 field in the User Info field of a trigger frame. Specifically, the AP STA sets the value of the AID12 field to a predefined value (or a configured value that is announced in, e.g., Beacon frames) to be determined (TBD), denoted herein as "TBD1" and selected to be any value determined to represent or otherwise be associated with priority-service non-AP STAs. It is noted that the TBD1 value for AID12 is different than the AID12 value used for UORA. The AID12=TBD1 may appear in Trigger frames with various Trigger Types such as: Basic, MU-RTS, Buffer Status Report Poll (BSRP), Buffer Query Report Poll (BQRP), and/or other types of trigger frames. If TBD2 is pre-defined it may be any value that is not used as an Association ID by any AP, e.g. 0x0001. If TBD2 is configured and announced in Beacon frames, then it may be chosen by an AP (as long as the AP does not assign it as an Association ID to a STA).

Another embodiment contemplates the use of a novel new Trigger Type denoted herein as a Priority Service trigger type. This trigger type is set to a value to be determined, denoted herein as "TBD2" and selected from one of the reserved trigger type values; namely, 8-15. In this embodiment, only non-AP STAs invoking dot11PriorityService are allowed to respond to a trigger frame with trigger type Service Priority.

Figure 4:
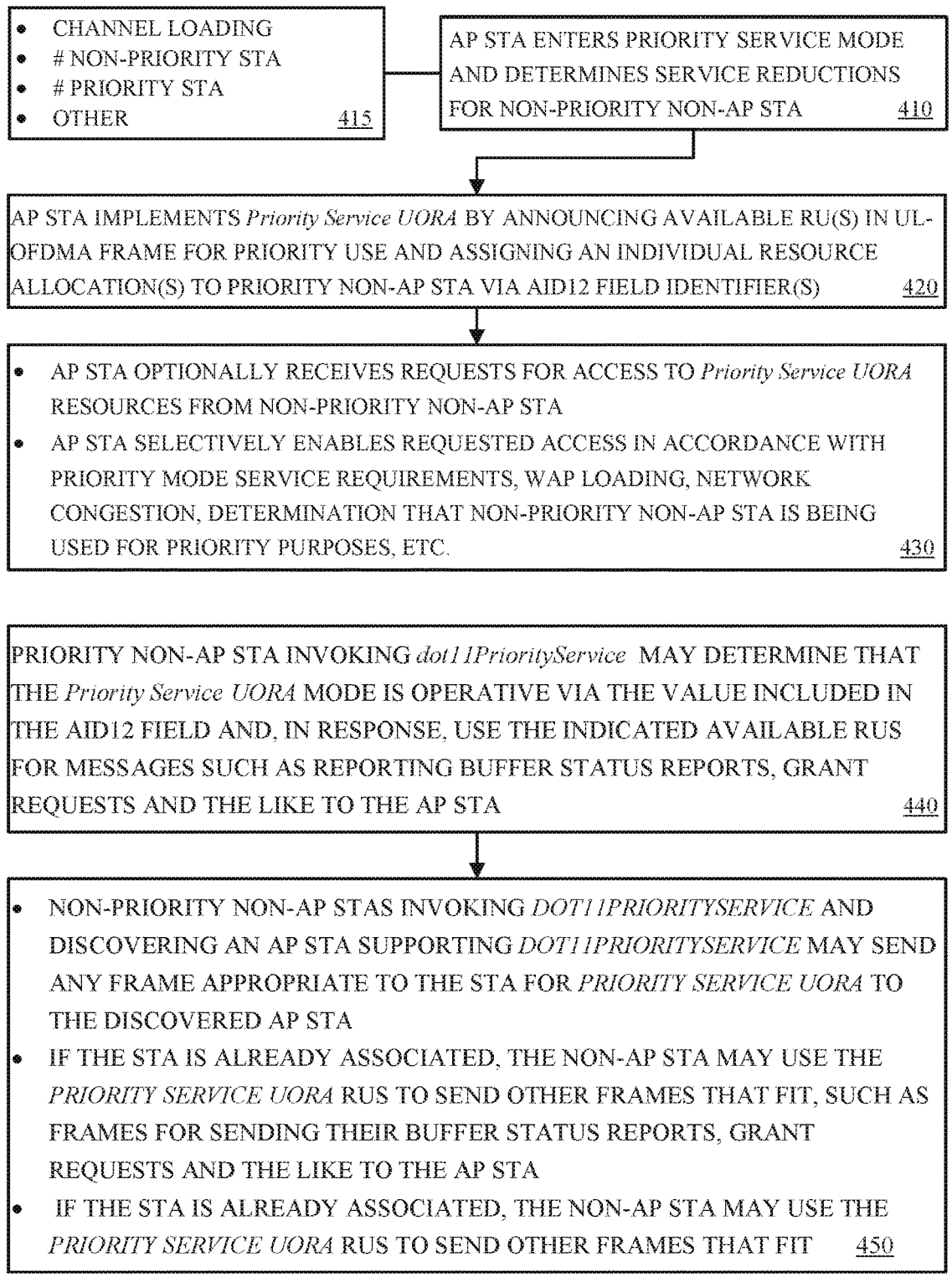
FIG. 4 depicts a flow diagram of a method of supporting priority services using a Priority Service UORA mechanism.

FIG. 4 depicts a flow diagram of a method of supporting priority services using a Priority Service UORA mechanism. Specifically, FIG. 4 depicts a flow diagram of a method 400 for an AP STA to determine and implement command-based service reductions via priority service communications to the non-AP STAs (steps 410-430) and for non-AP STA processing of priority service communications received the an AP STA (steps 440-450).

At step 410, an AP STA enters a priority service mode and determines a number of service reductions to be enacted with respect to non-priority non-AP STAs. Referring to box 415, these service reductions may be determined with respect to factors including, but not limited to, current channel loading in this BSS (or an ESS including this BSS), a number of non-AP STAs invoking priority access in this BSS/ESS, a number of connected non-priority non-AP STA in this BSS/ESS, and/or other factors such as described above with respect to step 210 and box 215 of the method 200 of FIG. 2.

At step 420, the AP STA implements an extended UL OFDMA-based random access (UORA) mode (i.e., Priority Service UORA) including advertising/announcing that one or more resource units (RUs) within an UL-OFDMA frame are available to be assigned for use by priority-service non-AP STAs. Specifically, in addition to the standard UORA mode signaling, the AP STA further provides signaling to indicate that a Priority Service UORA mode is being invoked. The additional signaling comprises, illustratively, providing an indication of assignment of individual resource allocation to a non-AP STA via the AID12 field in accordance with the User Info field format. In various embodiments, a specific identifier is used At step 430, the AP STA optionally receives requests for access to priority service UORA resources from non-priority non-AP STA and, in response, selectively enables the requested access in accordance with factors such as priority mode service requirements, WAP loading, network congestion, a determination that the requesting non-priority non-AP STA is being used for priority purposes, and/or other factors.

At step 440, priority non-AP STAs invoking dot11PriorityService may determine that the Priority Service UORA mode is operative via the value included in the AID12 field and, in response, use the indicated available RUs for messages such as reporting any pending buffer status reports, grant requests and the like to the AP STA.

At optional step 450, non-priority non-AP STAs invoking dot11PriorityService and discovering an AP STA supporting dot11PriorityService may send any frame appropriate to the STA, such as a Probe Request or Association Request in the dedicated resource units for Priority Service UORA to the discovered AP STA. If the STA is already associated, the non-AP STA may use the Priority Service UORA RUs to send other frames that fit, such as frames for sending their buffer status reports, grant requests and the like to the AP STA.

It is noted that the method 400 also contemplates that communications between AP STA and non-AP STA may be provided via trigger frames and, in particular, via the use of a Trigger Type denoted herein as a Priority Service trigger type as discussed above. In this manner, only those non-AP STAs invoking dot11PriorityService are allowed to respond to a trigger frame with trigger type Service Priority. Other non AP STAs will be considered non-priority by the AP STA.

Supporting Priority Service Via a Quiet Channel Mechanism

A fourth group of embodiments enhances service for low bandwidth priority communications by using a Quiet Channel information element (IE), which defines a time interval during which no transmission occurs in the current channel, normally to enable functions such as making channel measurements without receiving interference from other nearby STAs.

In 802.11, a Quiet Channel IE defines an interval during which no transmission occurs in the current channel. This interval might be used to assist in making channel measurements without interference from other STAs. The Quiet Channel IE is normally used to indicate a quiet interval of time for a secondary 80 MHz channel of a 160 MHz 802.11ac cell (it also indicates whether a primary 80 MHz channel can be used during the quiet interval). Quiet element includes these fields: ID, Length, Quiet Count, Quiet Period, Quiet Duration, Quiet Offset. The Quiet Channel IE includes the following fields: ID, Length, AP Quiet, Mode, Quiet Count, Quiet Period, Quiet Duration, Quiet Offset. Various embodiments are configured to utilize quiet channel behavior mechanisms similar to those described in IEEE 802.11ax, which may be adopted in whole or in part for use within the context of the IEEE 802.11be specifications.

The fourth group of embodiments extends the Quiet Channel IE to support a quiet period used for periodically assigning intervals to STAs with priority service. Specifically, the Quiet Channel IE is modified to include an additional field denoted herein as a Priority Service field. The Priority Service field exempts priority service non-AP STAs invoking dot11PriorityService from being quiet, thereby by forcing the remaining non-priority service non-AP STAs to be quiet, this embodiment prioritizes STAs with priority service. The priority service non-AP STAs may be associated with a specific traffic identifier (TID) or group of TIDs.

Additional embodiments address a situation wherein, due to possibility of presence of other AP STAs in the same channel, the quiet period for a particular channel invoked by one AP STA may not be observed by the other AP STAs as well as the non-AP STAs communicating with the other AP STAs via the particular channel. Specifically, the additional embodiments contemplate a mechanism by which an AP STA intending to roll out one or more channel quiet periods (e.g., to help non-AP STAs with priority service) may request corresponding channel quite periods from one or more other/neighboring AP STAs.

These additional embodiments further extend the Quiet Channel IE to support quiet channel requests to neighboring AP STAs. Specifically, the Quiet Channel IE is modified to include an additional field denoted herein as a Priority Service Exclusion field to identify the TIDs exempted from observing the quiet period.

A first AP STA may transmit a Quiet Period request using a Quiet Period Request IE with a Priority Service Exclusion field to identify the TIDs exempted from observing the quiet period. A second (or more) AP STA intending to support dot11PriorityService may (1) respond with a Quiet Period Response having an element with a SUCCESS response code or flag (i.e., an Acknowledgment of agreement with the request from the first AP STA); and (2) advertise the same quiet period included in the first AP STA's Quiet Period Request IE or Quiet Channel element, thereby causing non-AP STAs connected to the second (or more) AP STAs to go quiet on the same channel(s).

Figure 5:
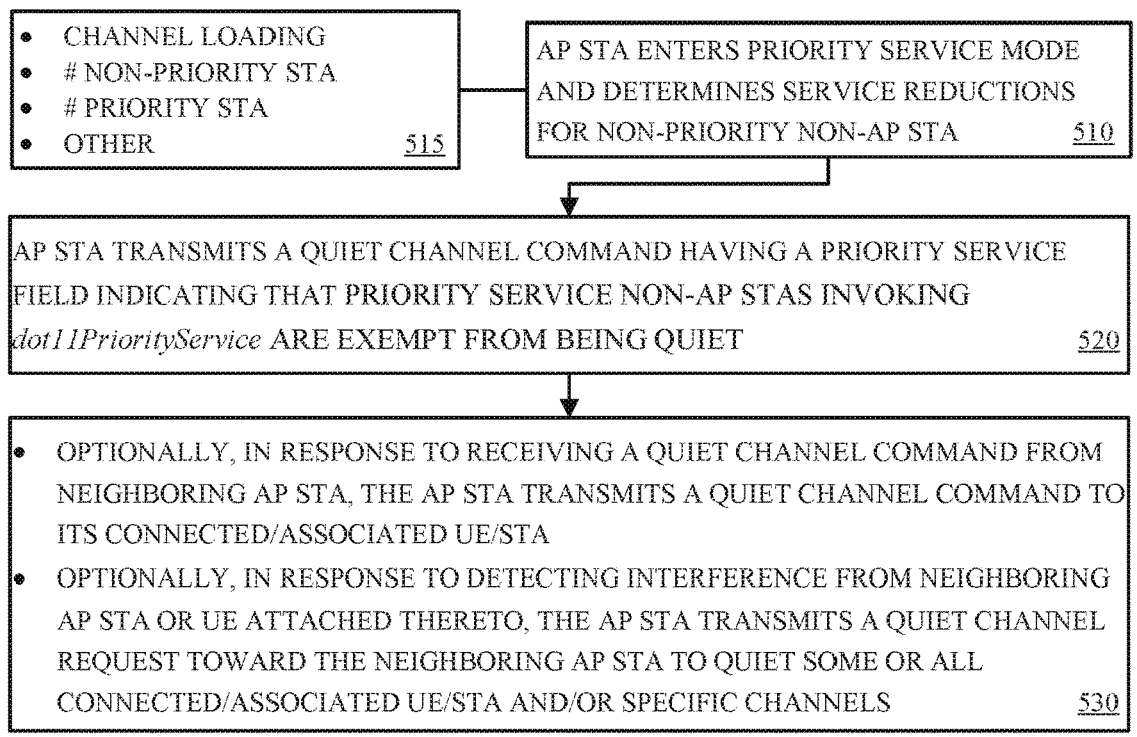
FIG. 5 depicts a flow diagram of a method of supporting priority services using a quiet channel mechanism according to an embodiment.
Figure 5:
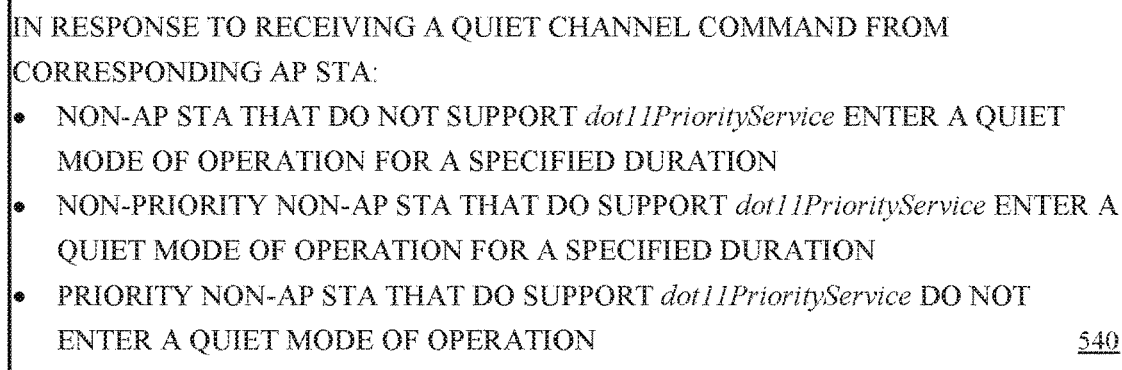

FIG. 5 depicts a flow diagram of a method of supporting priority services using a quiet channel mechanism according to an embodiment. Specifically, FIG. 5 depicts a flow diagram of a method for an AP STA to determine and implement quiet channel-based service reductions at non-AP STAs and, optionally, at neighboring AP STAs (steps 510-530), and for non-AP STA processing of quiet channel commands received from an AP STA (step 540).

At step 510, an AP STA enters a priority service mode and determines a number of service reductions to be enacted with respect to non-priority non-AP STAs. Referring to box 315, these service reductions may be determined with respect to factors including, but not limited to, current channel loading in this BSS (or an ESS including this BSS), a number of non-AP STAs invoking priority access in this BSS/ESS, a number of connected non-priority non-AP STA in this BSS/ESS, and/or other factors such as described above with respect to step 210 and box 215 of the method 200 of FIG. 2.

At step 520, the AP STA AP STA transmits a quiet channel command having a priority service field indicating that priority service non-AP STAs invoking dot11PriorityService are exempt from being quiet. This quiet channel command is configured to cause non-AP STAs connected to the AP STA to enter a quiet mode of operation for a specified duration, except the priority service non-AP STAs.

At optional step 530, in response to receiving a quiet channel command from neighboring AP STA, the AP STA transmits a corresponding quiet channel command to its connected/associated UE/non-AP STAs. Further and optionally, in response to detecting interference from neighboring AP STA(s) or non-AP STA(s) attached thereto, the AP STA transmits a quiet channel toward the neighboring non-AP STA(s) configured cause the neighboring AP STA(s) to quiet some or all of their respective connected/associated UE/non-AP STA(s) and/or specific channels.

At step 540, in response to receiving a quiet channel command from corresponding AP STA: (1) non-AP STA that do not support dot11priorityservice enter a quiet mode of operation for a specified duration and according to the timing pattern specified in the fields of the Quiet element or Quiet Channel element; (2) non-priority non-AP STA that do support dot11priorityservice enter a quiet mode of operation for the specified duration and according to the timing pattern specified in the fields of the Quiet element or Quiet Channel element; and (3) priority non-AP STA that do support dot11priorityservice do not enter a quiet mode of operation Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for reducing network services provided to non-priority stations (STAs) via an 802.11 access point (AP) STA configured to provide services to priority STAs and non-priority STAs, comprising:
   receiving, at a non-priority STA in communication with an AP STA via a communication channel, a message from the AP STA;
   in response to the received message including a dot11priorityAccessAssertion information element (IE) including a dot11priorityAccessEnforced field, causing the non-priority STA to refrain from accessing the communication channel for an amount of time indicated by a duration value in a durationOfdot11prioriyAccessEnforced field of the dot11priorityAccessAssertion IE; and
   in response to the received message including a dot11priorityAccessAssertion IE including an allowedCAPCduringpriorityAccess field, causing the non-priority STA to refrain from accessing the communication channel for an amount of time indicated by a duration value in a durationOfdot11prioriyAccessEnforced field of the dot11priorityAccessAssertion IE, causing the non-priority STA to refrain from accessing the communication channel if a target wake time (TWT) of the non-priority STA is not expiring during a current channel occupancy times (COT).

2. The method of claim 1, further comprising:
   in response to the received message including a dot11priorityAccessAssertion IE including a Priority Service Indicator (PSI), causing the non-priority STA to establish communication with the AP STA via a different communication channel.

3. The method of claim 1, wherein the duration value in the durationOfdot11prioriyAccessEnforced field represents the amount of time as a number units of time units or a number of subsequent channel occupancy times (COTs).

4. The method of claim 1, wherein the received message comprises any of a Beacon Frame, a Traffic Indication Map (TIM) Broadcast request with Channel Switch Announcement (CSA), and an Extended CSA IE.

5. A method for supporting priority services at an 802.11 access point (AP) station (STA), comprising:
   at an AP STA, entering a priority service mode and determining an amount of service reduction to impose upon non-priority non-AP STAs in communication with the AP STA;
   transmitting, toward non-AP STAs in communication with the AP STA, one or more messages including a dot11priorityAccessAssertion information element (IE) including a dot11priorityAccessEnforced field and a durationOfdot11prioriyAccessEnforced field, and configured to cause a receiving non-priority STA to refrain from accessing a respective communication channel for an amount of time indicated by a duration value in the durationOfdot11prioriyAccessEnforced field; and
   including in the dot11priorityAccessAssertion IE of the one or more messages an allowedCAPCduringpriorityAccess field configured to cause a receiving non-priority STA to refrain from accessing the communication channel if a target wake time (TWT) of the non-priority STA is not expiring during a current channel occupancy times (COT).

6. The method of claim 5, further comprising:
   including in the dot11priorityAccessAssertion IE of the one or more messages a Priority Service Indicator (PSI) configured to cause a receiving non-priority STA to establish communication with the AP STA via a different communication channel.

7. The method of claim 5, wherein the duration value in the durationOfdot11prioriyAccessEnforced field represents the amount of time as a number units of time units or a number of subsequent channel occupancy times (COTs).

8. The method of claim 5, wherein the AP STA message comprises any of a Beacon Frame, a Traffic Indication Map (TIM) Broadcast request with Channel Switch Announcement (CSA), and an Extended CSA IE.

9. The method of claim 5, further comprising:
   transmitting, toward non-AP STAs in communication with the AP STA, one or more TWT related messages including an extendTWTduetodot11priorityservice IE configured to cause non-priority non-AP STAs to extend a respective TWT.

10. The method of claim 9, wherein said one or more TWT related messages comprise any of a Demand TWT message and a Suggest TWT.

11. The method of claim 9, wherein said one or more TWT related messages comprise a broadcast TWT message.

12. A method for supporting priority services at an 802.11 access point (AP) station (STA), comprising:
   at an AP STA, entering a priority service mode and determining an amount of service reduction to impose upon non-priority non-AP STAs in communication with the AP STA;
   transmitting, toward non-AP STAs in communication with the AP STA, one or more messages including a dot11priorityAccessAssertion information element (IE) including a dot11priorityAccessEnforced field and a durationOfdot11prioriyAccessEnforced field, and configured to cause a receiving non-priority STA to refrain from accessing a respective communication channel for an amount of time indicated by a duration value in the durationOfdot11prioriyAccessEnforced field; and
   transmitting, toward non-AP STAs in communication with the AP STA, a message announcing an availability of one or more resource units (RUs) within an UL-OFDMA frame, and including a predetermined value stored in an AID12 field and configured to cause non-priority non-AP STAs to refrain from reporting data within advertised RUs.

13. The method of claim 12, wherein only priority non-AP STAs may access the advertised RUs.

14. The method of claim 12, further comprising:
transmitting, toward non-AP STAs in communication with the AP STA, a quiet channel command having a priority service field configured to cause only non-priority non-AP STAs to enter a quiet mode of operation.

15. The method of claim 14, wherein said transmitting of said quiet channel command is performed in accordance with a quiet channel command received from a neighboring AP STA.

16. The method of claim 14, further comprising:
transmitting, toward at least one neighboring AP STA, a quiet channel command having a priority service field configured to cause respective non-AP STAs communicating via a specified channel to enter a quiet mode of operation.

17. A system, comprising:
at least one 802.11 access point (AP) station (STA) configured to provide network services to a respective plurality of non-AP STAs;
at least one AP STA, in a priority service mode of operation, transmitting toward respective non-AP STAs in communication with the AP STA, one or more messages including a dot11priorityAccessAssertion information element (IE) including a dot11priorityAccessEnforced field and a durationOfdot11prioriyAccessEnforced field, and configured to cause a receiving non-priority STA to refrain from accessing a respective communication channel for an amount of time indicated by a duration value in the durationOfdot11prioriyAccessEnforced field; and
at least one AP STA, in the priority service mode of operation, including in the dot11priorityAccessAssertion IE of the one or more messages an allowedCAPCduringpriorityAccess field configured to cause a receiving non-priority STA to refrain from accessing the communication channel if a target wake time (TWT) of the non-priority STA is not expiring during a current channel occupancy times (COT).

18. The system of claim 17, further comprising:
at non-priority STA in communication with the AP STA, in response to receiving a message including a dot11priorityAccessAssertion information element (IE) including a dot11priorityAccessEnforced field, refraining from accessing the respective communication channel for an amount of time indicated by a duration value in the durationOfdot11prioriyAccessEnforced field of the dot11priorityAccessAssertion IE.

19. The system of claim 17, further comprising:
at least one AP STA, in the priority service mode of operation, selecting a duration value in response to a determined amount of service reduction to impose upon a respective plurality of non-priority STAs in communication with the AP STA.

20. A system, comprising:
at least one 802.11 access point (AP) station (STA) configured to provide network services to a respective plurality of non-AP STAs;
at least one AP STA, in a priority service mode of operation, transmitting toward respective non-AP STAs in communication with the at least one AP STA, one or more messages including a dot11priorityAccessAssertion information element (IE) including a dot11priorityAccessEnforced field and a durationOfdot11prioriyAccessEnforced field, and configured to cause a receiving non-priority STA to refrain from accessing a respective communication channel for an amount of time indicated by a duration value in the durationOfdot11prioriyAccessEnforced field; and
at least one AP STA, in the priority service mode of operation, transmitting toward non-AP STAs in communication with the AP STA, a message announcing an availability of one or more resource units (RUs) within an UL-OFDMA frame, and including a predetermined value stored in an AID12 field and configured to cause non-priority STAs to refrain from reporting data within the one or more RUs.

21. The system of claim 17, further comprising:
at least one AP STA, in the priority service mode of operation, transmitting toward non-AP STAs in communication with the AP STA, a quiet channel command having a priority service field configured to cause only non-priority non-AP STAs to enter a quiet mode of operation.

22. A tangible and non-transient computer readable storage medium storing instructions which, when executed by a computer, adapt the operation of the computer to provide a method for supporting priority services at an 802.11 access point (AP), comprising:
at an AP STA, entering a priority service mode and determining an amount of service reduction to impose upon non-priority non-AP STAs in communication with the AP STA;
transmitting, toward non-AP STAs in communication with the AP STA, one or more messages including a dot11priorityAccessAssertion information element (IE) including a dot11priorityAccessEnforced field and a durationOfdot11prioriyAccessEnforced field, and configured to cause a receiving non-priority STA to refrain from accessing a respective communication channel for an amount of time indicated by a duration value in the durationOfdot11prioriyAccessEnforced field; and
transmitting, toward non-AP STAs in communication with the AP STA, a message announcing an availability of one or more resource units (RUs) within an UL-OFDMA frame, and including a predetermined value stored in an AID12 field and configured to cause non-priority non-AP STAs to refrain from reporting data within advertised RUs.

23. The system of claim 20, further comprising:
at least one AP STA, in the priority service mode of operation, transmitting toward non-AP STAs in communication with the AP STA, a quiet channel command having a priority service field configured to cause only non-priority non-AP STAs to enter a quiet mode of operation.

* * * * *